(12) United States Patent
Horiuchi et al.

(10) Patent No.: US 9,475,386 B2
(45) Date of Patent: Oct. 25, 2016

(54) VEHICLE ACCELERATOR PEDAL APPARATUS

(71) Applicant: HONDA MOTOR CO., LTD., Minato-ku, Tokyo (JP)

(72) Inventors: Yosuke Horiuchi, Wako (JP); Hideto Nebuya, Wako (JP); Motomasa Suzuki, Wako (JP); Ayumu Yamaguchi, Wako (JP); Mitsunori Hirai, Wako (JP); Kiyohiro Mando, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/760,007

(22) PCT Filed: Oct. 4, 2013

(86) PCT No.: PCT/JP2013/077049
§ 371 (c)(1),
(2) Date: Jul. 9, 2015

(87) PCT Pub. No.: WO2015/049786
PCT Pub. Date: Apr. 9, 2015

(65) Prior Publication Data
US 2015/0360563 A1 Dec. 17, 2015

(51) Int. Cl.
*G05G 1/30* (2008.04)
*B60K 26/02* (2006.01)
(Continued)

(52) U.S. Cl.
CPC ............. *B60K 26/021* (2013.01); *B60K 26/02* (2013.01); *F02D 11/02* (2013.01); *F02D 11/04* (2013.01);
(Continued)

(58) Field of Classification Search
CPC .......... B60K 26/021; B60K 2026/023; F02D 11/06

USPC ........................................................... 74/513
See application file for complete search history.

(56) References Cited

U.S. PATENT DOCUMENTS

| 4,224,832 A * | 9/1980 | Prohaska ................ B60T 7/042 303/3 |
| 6,453,767 B1 | 9/2002 | Willemsen et al. |

(Continued)

FOREIGN PATENT DOCUMENTS

| DE | 10 2010 029 199 A1 | 12/2010 |
| DE | 10 2011 079 375 A1 | 4/2012 |

(Continued)

OTHER PUBLICATIONS

Extended European search report dated May 27, 2016, issued in the corresponding EP patent application 13895100.9.

*Primary Examiner* — Vicky Johnson
(74) *Attorney, Agent, or Firm* — Carrier Blackman & Associates, P.C.; Joseph P. Carrier; William D. Blackman

(57) ABSTRACT

A vehicle accelerator pedal apparatus including: a pedal-side arm supported, so as to allow rotation toward the front and rear of the vehicle, by a support shaft in a housing; a pad in the pedal-side arm that can be operated by stepping; and a reaction force application mechanism for applying reaction force to the pedal-side arm. The reaction force application mechanism includes a drive source for generating the reaction force, and a transmission member for transmitting the reaction force generated by the drive source to the pedal-side arm. The reaction force application mechanism is arranged higher than the housing. The pedal-side arm has an extension part that is extended on the opposite side from the pad across the support shaft, and from the pedal-side arm to the transmission member.

9 Claims, 10 Drawing Sheets

(51) Int. Cl.
  *F02D 11/04* (2006.01)
  *G05G 5/03* (2008.04)
  *F02D 11/02* (2006.01)
  *G05G 1/405* (2008.04)
(52) U.S. Cl.
  CPC ............... *G05G 1/405* (2013.01); *G05G 5/03* (2013.01); *B60K 2026/022* (2013.01); *B60K 2026/023* (2013.01); *Y10T 74/20534* (2015.01)

(56) References Cited

U.S. PATENT DOCUMENTS

| | | | |
|---|---|---|---|
| 8,378,531 B2* | 2/2013 | Noh | B60K 26/021 310/12.04 |
| 8,670,913 B2 | 3/2014 | Sakaguchi et al. | |
| 8,738,261 B2 | 5/2014 | Yamazaki et al. | |
| 8,770,060 B2 | 7/2014 | Maruyama et al. | |
| 8,794,103 B2 | 8/2014 | Osawa et al. | |
| 9,182,774 B2 | 11/2015 | Drews et al. | |
| 2010/0294074 A1 | 11/2010 | Muraji et al. | |
| 2011/0098901 A1* | 4/2011 | Shiomi | B60K 26/021 701/70 |
| 2011/0132134 A1 | 6/2011 | Kim et al. | |
| 2012/0169488 A1 | 7/2012 | Thiel et al. | |
| 2013/0091977 A1 | 4/2013 | Fukushima et al. | |
| 2013/0152725 A1* | 6/2013 | Maruyama | B60K 26/021 74/513 |

FOREIGN PATENT DOCUMENTS

| | | |
|---|---|---|
| JP | 2002-287838 A | 10/2002 |
| JP | 2004-323018 A | 11/2004 |
| JP | 2010-269638 A | 12/2010 |
| JP | 2011-068176 A | 4/2011 |
| JP | 2011-251667 A | 12/2011 |
| JP | 2012-171526 A | 9/2012 |
| WO | 00/68755 A1 | 11/2000 |
| WO | 2011/105125 A1 | 9/2011 |
| WO | 2012/029503 A1 | 3/2012 |

* cited by examiner

VEHICLE ACCELERATOR PEDAL APPARATUS

TECHNICAL FIELD

The present invention relates to an improvement in a vehicle accelerator device provided with a reaction-force-applying mechanism for applying a reaction force to a pedal-side arm that a driver depresses.

BACKGROUND ART

Vehicle accelerator devices provided with reaction-force-applying mechanisms have been known, e.g. in Patent Document 1, in which a reaction force is applied to a pedal-side arm from a reaction-force-applying mechanism in accordance with an amount by which the pedal-side arm is depressed or other information.

The vehicle accelerator device known in Patent Document 1 includes a housing mounted on a vehicle body, a pedal-side arm pivotably supported in the housing, a pad provided on a lower end of the pedal-side arm and used for depressing the pedal-side arm, and a reaction-force-applying mechanism for applying a reaction force to the pedal-side arm. The pedal-side arm extends downward from the housing. The reaction-force-applying mechanism is disposed between the housing positioned above and the pad positioned below, and is incorporated into the housing. The reaction-force-applying mechanism includes a motor for generating the reaction force, a reduction gear for reducing the rotational speed of the motor output, and a motor-side arm mounted on an output shaft of the reduction gear. The motor-side arm is a member for applying the reaction force generated by the motor to the pedal-side arm.

A brake pedal is proximal to the accelerator device. Depending on the type of vehicle, the accelerator device may be disposed near the wheel house of a front wheel. Therefore, the accelerator device needs to be able to be easily disposed in a non-interfering manner even when the device is laterally proximal to the wheel house or the brake pedal. Specifically, a high degree of freedom is required in regard to where the accelerator device is to be disposed.

However, because the motor and the reduction gear of the reaction-force-applying mechanism are connected in a lateral or vehicle width direction, the size of the reaction-force-applying mechanism is large in the vehicle width direction. Therefore, the entire accelerator device has a large size in the vehicle width direction. In addressing this situation, it has been suggested that the lateral size of the reaction-force-applying mechanism be reduced; however, merely reducing the width of the reaction-force-applying mechanism results in complicating the configuration of the reaction-force-applying mechanism. Accordingly, there is scope for improvement.

PRIOR ART LITERATURE

Patent Literature

Patent Document 1: International Publication (WO-A) No. 2012/029503

SUMMARY OF INVENTION

Technical Problem

The present invention seeks to provide a technique which is capable of enhancing the degree of freedom in arranging a vehicle accelerator device provided with a reaction-force-applying mechanism.

Solution to Problem

According to a first aspect of the present invention, there is provided a vehicle accelerator device comprising a housing mountable on a vehicle body, a pedal-side arm pivotably supported by a support shaft in the housing for undergoing pivotal movement in a front-rear direction of the vehicle body, a depressible pad provided on the pedal-side arm, and a reaction-force-applying mechanism for applying a reaction force to the pedal-side arm against a depressing force applied to the pad, the reaction-force-applying mechanism comprising a drive source for generating the reaction force and a transmitting member for transmitting the reaction force generated by the drive source to the pedal-side arm, wherein the vehicle accelerator device is characterized in that: the reaction-force-applying mechanism is disposed above the housing; the pedal-side arm has an extension part extending to a side opposite the pad, across the support shaft, and from the pedal-side arm toward the transmitting member; and the extension part comes into contact with the transmitting member when the reaction force is received from the transmitting member.

According to a second aspect of the present invention, preferably, the reaction-force-applying mechanism is set apart from the housing, and is mounted on the vehicle body so as to be separate from the housing; and only the extension part of the pedal-side arm comes into contact with the transmitting member.

According to a third aspect of the present invention, preferably, the pedal-side arm comprises a first arm part pivotably supported in the housing by the support shaft for undergoing pivotal movement in the front-rear direction of the vehicle body and a second arm part positioned outside of the housing and provided on the first arm part; and the pad and the extension part are provided on the second arm part.

According to a fourth aspect of the present invention, preferably, the pad is disposed so as to be able to be adjacent to a brake pedal in a vehicle width direction; the second arm part comprises a mounting part mounted to a lateral side surface of the first arm part and a bent part bending from the mounting part to a side laterally opposite the brake pedal; and the pad is provided on the bent part.

According to a fifth aspect of the present invention, preferably, a gap is present at a position where the housing and the extension part are closest when the pedal-side arm pivots between an initial position at which the pad is not depressed and a maximum-depression position at which the pad is depressed by a maximum amount; and the second arm part is disposed in relation to the housing such that the gap decreases in correspondence with the pivoting of the pedal-side arm from the initial position toward the maximum-depression position.

According to a sixth aspect of the present invention, preferably, the position of the pedal-side arm closest to the housing and the extension part when positioned at the initial position is on an upper edge of the housing; and the extension part has a slanting part slanting toward the housing while extending above the upper edge of the housing.

According to a seventh aspect of the present invention, preferably, an arm proximal end part provided on the first arm part and supported by the support shaft is accommodated inside the housing; a distal end part of the first arm part is exposed to the outside through an opening in the housing; the second arm part comprises a mounting part mounted to a lateral side surface of the first arm part and a curved part curving so as to separate laterally from a side edge of the opening; the mounting part is disposed below the opening; and the curved part is disposed across the side edge of the opening.

According to an eighth aspect of the present invention, preferably, the drive source comprises an electric motor for generating the reaction force and a reduction gear for reducing a rotational speed of the electric motor and outputting the reduced speed; the transmitting member is connected to an output shaft of the reduction gear and is configured by a motor-side arm for transmitting the reaction force to the pedal-side arm; the reaction-force-applying mechanism has a bracket for supporting the electric motor and the reduction gear; and the bracket has a cable guard extending outward and upward of a range in which the motor-side arm can pivot and move.

According to a ninth aspect of the present invention, preferably, an outer circumference and an upper side of the electric motor are covered by a heat-blocking cover for blocking at least part of heat generated by the electric motor.

Advantageous Effects of Invention

According to the first aspect of the invention, the reaction force-applying mechanism for applying reaction force to the pedal-side arm is disposed above a housing in which the pedal-side arm is supported by the support shaft. Specifically, because a unit composed of the housing and the pedal-side arm supported in the housing does not include the reaction-force-applying mechanism, the unit has a small size in the lateral or vehicle width direction. The unit, being of small width, can be easily disposed in a non-interfering manner even when the unit is laterally proximal to a wheel house or a brake pedal. However, the reaction-force-applying mechanism includes the drive source for generating reaction force and the transmitting member for transmitting the reaction force generated by the drive source to the pedal-side arm, and therefore has larger lateral size than the unit. The reaction-force-applying mechanism, being of large width, is disposed above the housing of the unit, which is of small width. For example, the reaction-force-applying mechanism can be disposed above the wheel house or the pad of the brake pedal, thereby preventing interference therebetween.

The lateral size of the portion of the vehicle accelerator device closest to the wheel house or the brake pedal in the lateral direction, specifically the lateral size of the unit, can thus be reduced as much as possible. The accelerator device, being of small width, can be easily disposed without any interference with the wheel house, the brake pedal, or other members positioned in the lateral vicinity of the accelerator device. The degree of freedom in arranging the accelerator device in the vehicle is enhanced.

The pedal-side arm has the extension part extending to a side opposite the pad, across the support shaft, and from the pedal-side arm toward the transmitting member of the reaction-force-applying mechanism. The extension part comes into contact with the transmitting member when the reaction force is received from the transmitting member. Therefore, the configuration of the reaction-force-applying mechanism can be kept simple despite having the reaction-force-applying mechanism disposed above the housing. The accelerator device can therefore be obtained at low cost.

According to the second aspect of the invention, the transmitting member of the reaction-force-applying mechanism comes into contact with only the extension part, whereby the reaction-force-applying mechanism can apply the reaction force to the pedal-side arm. Moreover, the reaction-force-applying mechanism is set apart from the housing, and is mounted on the vehicle body so as to be separate from the housing. Therefore, each of the housing and the reaction-force-applying mechanism can be mounted on the vehicle body in respectively desired locations. Therefore, an even larger degree of freedom can be used in regard to where to dispose the vehicle accelerator device in the vehicle.

According to the third aspect of the invention, the pedal-side arm includes the first arm part pivotably supported in the housing by the support shaft for undergoing pivotal movement in the front-rear direction of the vehicle body, and the second arm part positioned outside of the housing and provided on the first arm part. Therefore, it is possible to determine whether or not the second arm part should be present according to, e.g., whether the reaction-force-applying mechanism is present. In a first case in which the vehicle accelerator device is not provided with the reaction-force-applying mechanism, it is possible to use only the first arm part without using the second arm part. In a second case in which the vehicle accelerator device is provided with the reaction-force-applying mechanism, the second arm part provided with the pad and the extension part is made available and is provided on the first, arm part. In both the first case and the second case, the housing and an inner mechanism built into the housing can be jointly used. The accelerator device can therefore be obtained at low cost.

According to the fourth aspect of the invention, the second arm part is mounted on the lateral side surface of the first arm part. Therefore, the second arm part can be easily mounted on the first arm part without contact being made with the housing. The second arm part also has the bent part bending from the mounting part mounted on the first arm part to the side laterally opposite the brake pedal, the pad being provided to the bent part. Therefore, the vehicle accelerator device can be easily disposed while interference with the brake pedal positioned in the lateral vicinity of the accelerator device is sufficiently avoided.

According to the fifth aspect of the invention, the gap at the position where the extension part is closest to the housing decreases in correspondence with the pivoting of the pedal-side arm from the initial position at which the pedal-side arm is not depressed toward the maximum-depression position. Specifically, the gap when the pedal-side arm is in the initial position is larger than the gap when the pad is depressed. Even if some foreign object gets sandwiched between the housing and the extension part, specifically in the gap, while the pad is being depressed, the gap can be increased by releasing the step-on or depressing operation (returning the pedal-side arm to the initial position). As a result, the foreign object falls out of the gap. By thus releasing the depressing operation, the pedal-side arm is allowed to return to the initial position without any adverse effect caused by the foreign object.

According to the sixth aspect of the invention, the extension part is closest to the upper edge of the housing when the pedal-side arm is positioned at the initial position. The extension part has a slanting part slanting toward the housing while extending above the upper edge of the housing. The slanting part approaches the housing in correspondence with the pivoting of the pedal-side arm from the initial position toward the maximum-depression position. Therefore, the gap at the position where the extension part is closest to the upper edge of the housing is decreased in size. The slanting part then separates from the housing in correspondence with the returning of the pedal-side arm from the maximum-depression position to the initial position. The gap at the position where the extension part is closest to the upper edge of the housing is increased in size. Therefore, sandwiching of a foreign object in a direction in which the pedal-side arm returns from the maximum-depression position to the initial position can be minimized.

According to the seventh aspect of the invention, the second arm part has the mounting part mounted to the lateral side surface of the first arm part and the curved part curving so as to separate laterally from the side edge of the opening in the housing. The mounting part is disposed below the opening. The curved part is disposed across the side edge of the opening. Therefore, the gap between the housing and the second arm part can be increased in size at the position where the second arm part is disposed across the side edge of the opening. Sandwiching of the foreign object in the gap in the vicinity of the opening can therefore be minimized.

According to the eighth aspect of the invention, the reaction-force-applying mechanism includes the bracket for supporting the electric motor and the reduction gear. Harnesses, cables, or other types of wires used for other devices often pass around the reaction-force-applying mechanism mounted on the vehicle. In response, the bracket has the cable guard extending outward and upward of a range in which the motor-side arm can pivot and move. The pivoting motor-side arm can be protected by the cable guard so as not to come into contact with the wires.

According to the ninth aspect of the invention, the outer circumference and the upper side of the electric motor are covered by the heat-blocking cover for blocking at least part of heat generated by the electric motor. Therefore, it is possible to block the heat using the heat-blocking cover so that the heat generated by the electric motor does not affect the harnesses, cables, or other types of wires.

DESCRIPTION OF EMBODIMENTS

A certain preferred embodiment of the present invention will be described below with reference to the accompanying sheets of drawings.

Embodiment

Figure 1:
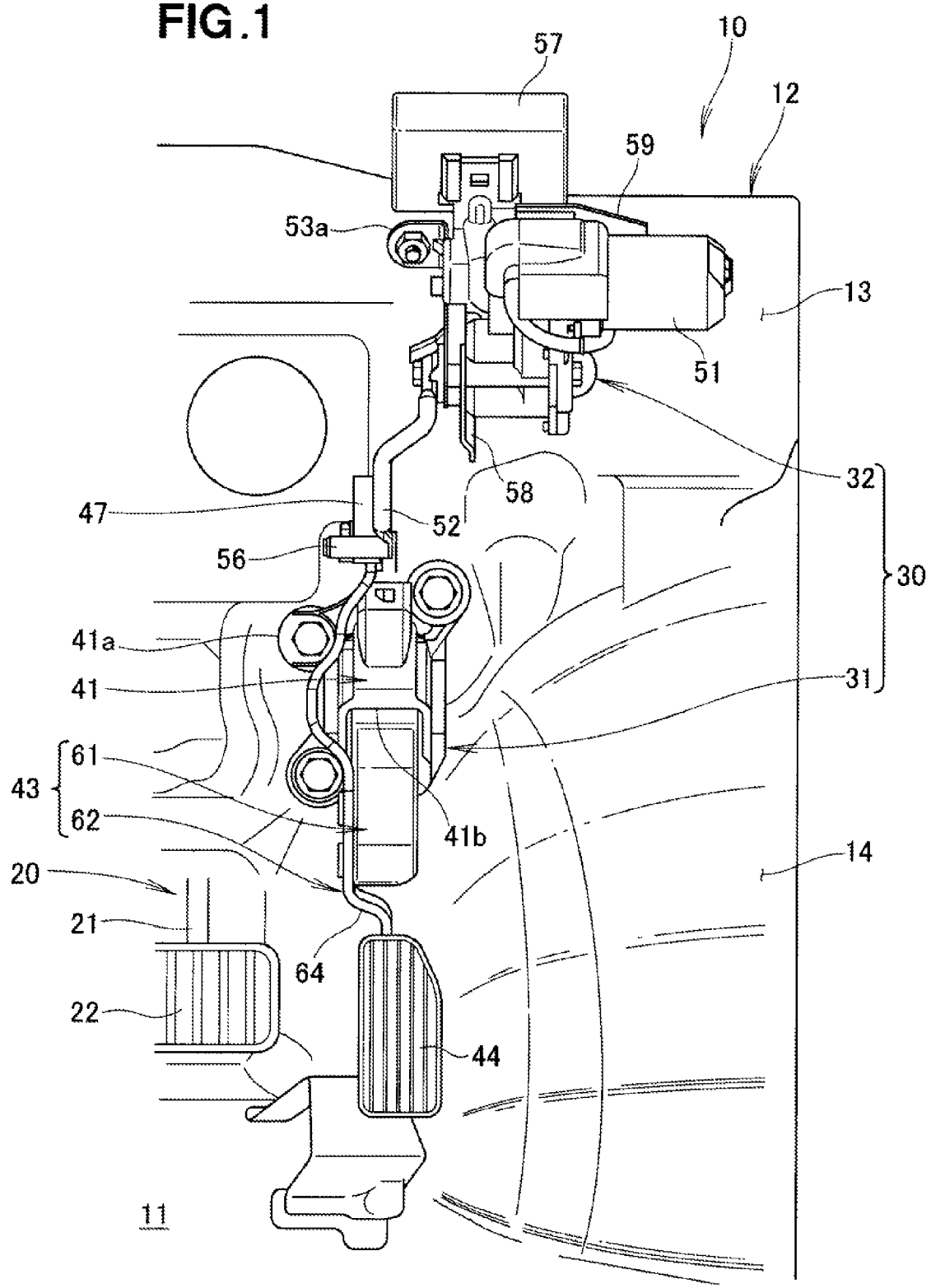
FIG. 1 is a view of a configuration in which a vehicle accelerator device according to the present invention is mounted on a vehicle body, seen from the pad-depressing direction.
Figure 2:
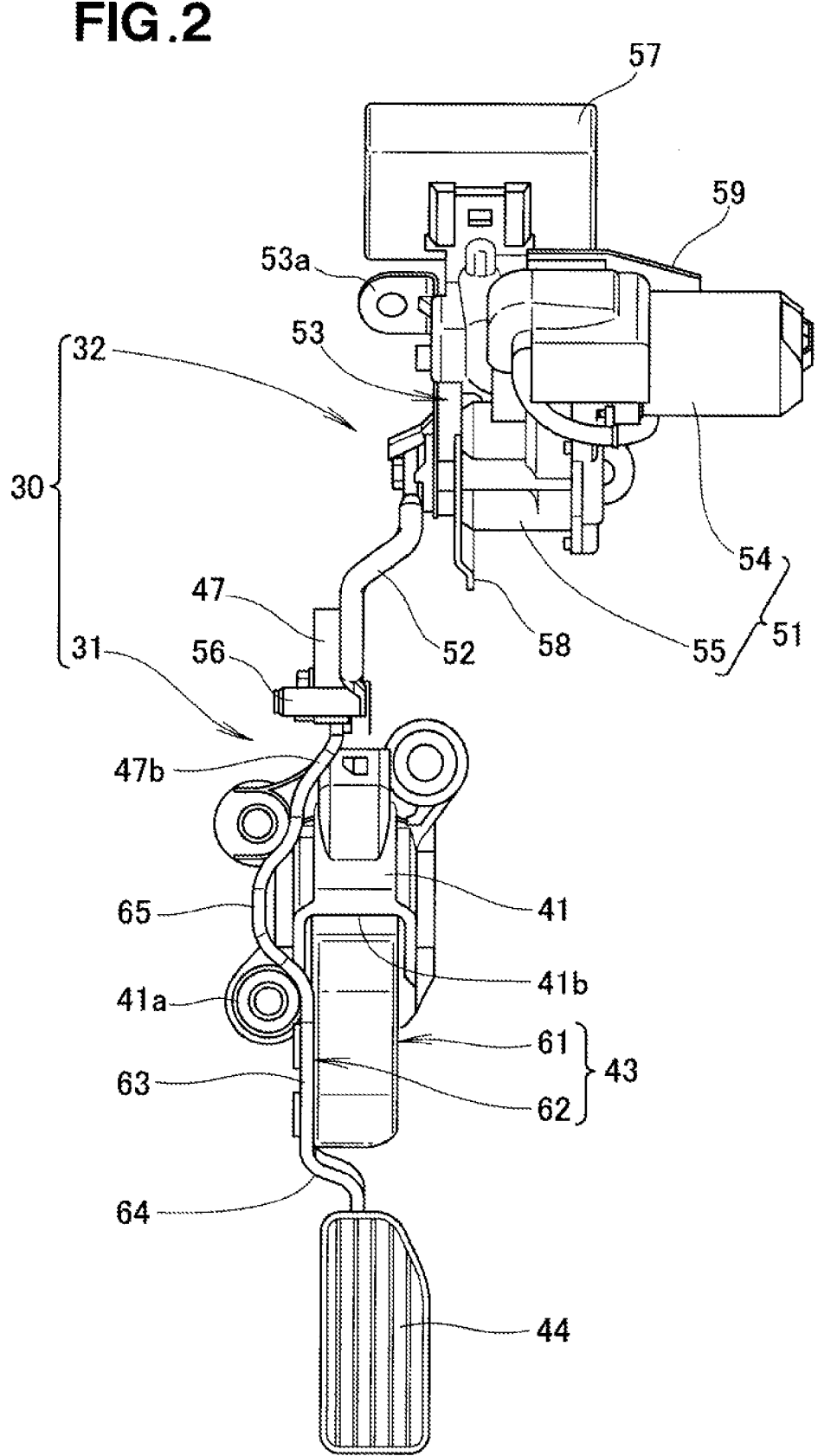
FIG. 2 is an enlarged view of the vehicle accelerator device shown in FIG. 1.
Figure 3:
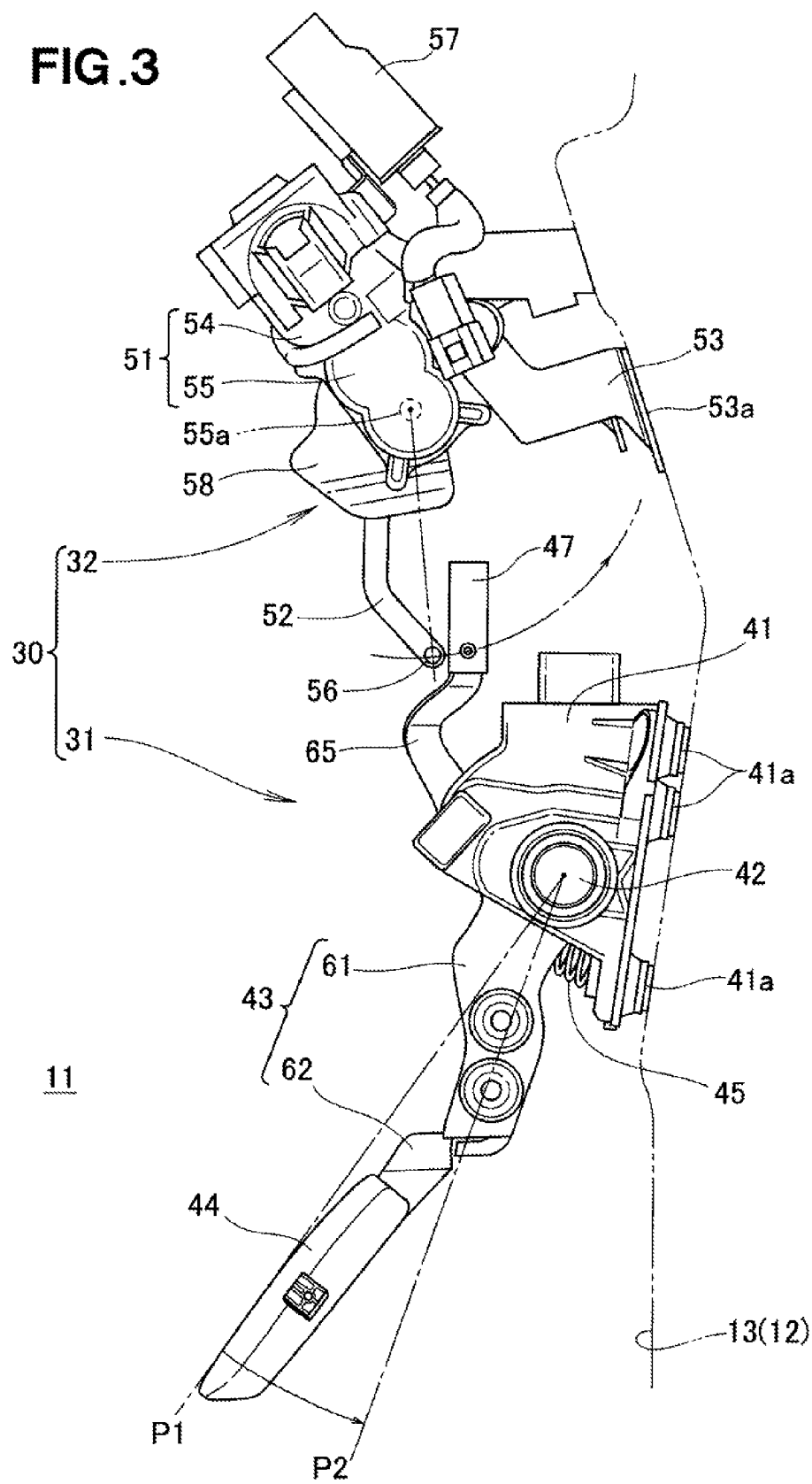
FIG. 3 is a right side view of the vehicle accelerator device shown in FIG. 2.

A vehicle accelerator device according to the preferred embodiment will now be described. As shown in FIGS. 1 through 3, a vehicle 10 takes the form of, e.g. a passenger vehicle, and is provided with a vehicle braking device 20 and a vehicle accelerator device 30. The two devices 20, 30 are located in a front part of a passenger compartment 11, and are mounted on a vehicle body 12, e.g. a lower dashboard panel 13.

The vehicle braking device 20 is disposed on a laterally inward side. The vehicle accelerator device 30 is disposed on a laterally outward side and is adjacent to a wheel house 14 for a front wheel. Specifically, the vehicle accelerator device 30 is adjacent to the vehicle braking device 20.

The vehicle accelerator device 30 (hereinafter simply referred to as "accelerator device 30") includes an accelerator pedal unit 31 and a reaction-force-applying mechanism 32.

Figure 4:
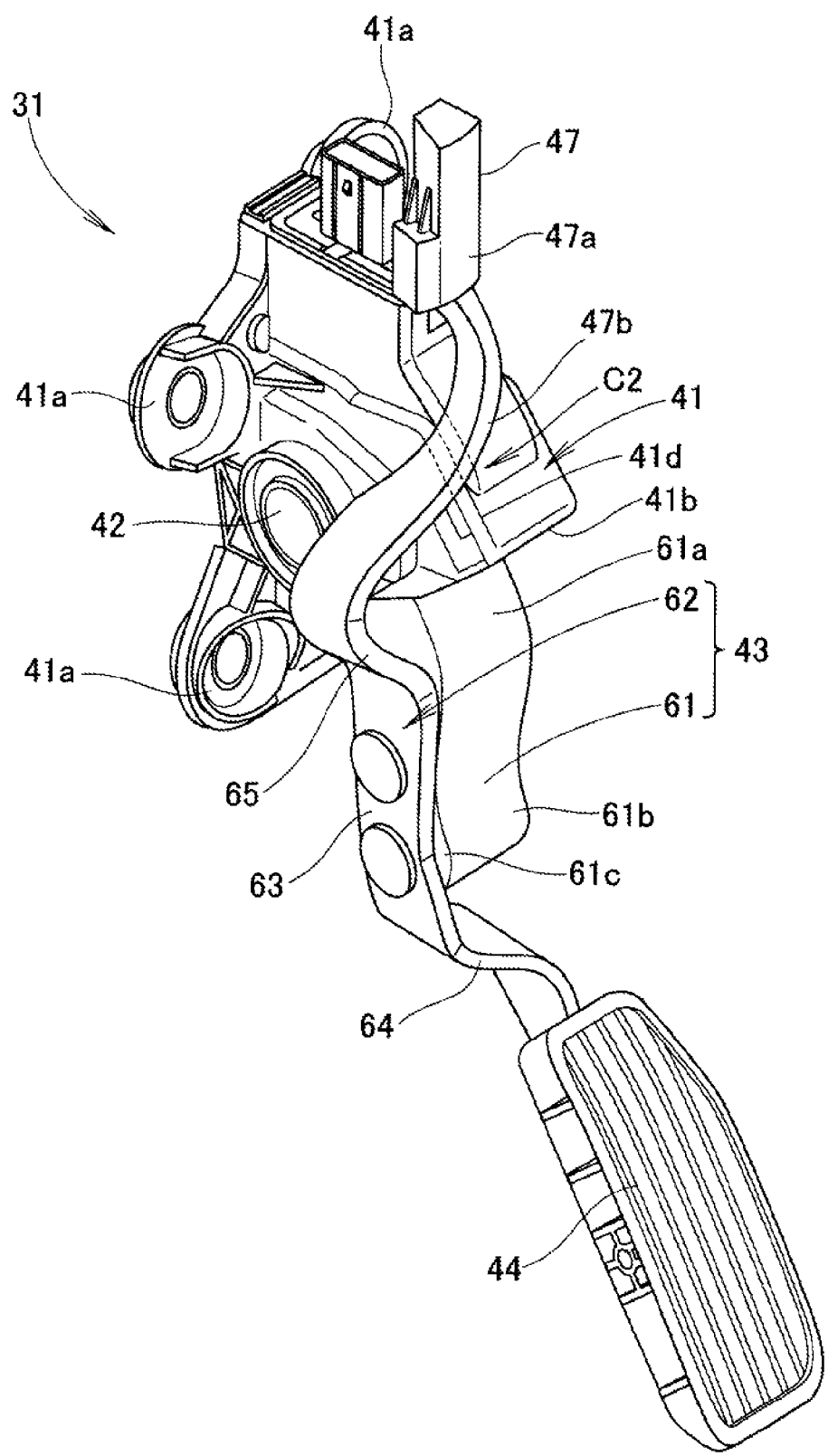
FIG. 4 is a perspective view of an accelerator pedal unit shown in FIG. 2, seen from the upper-left.
Figure 5:
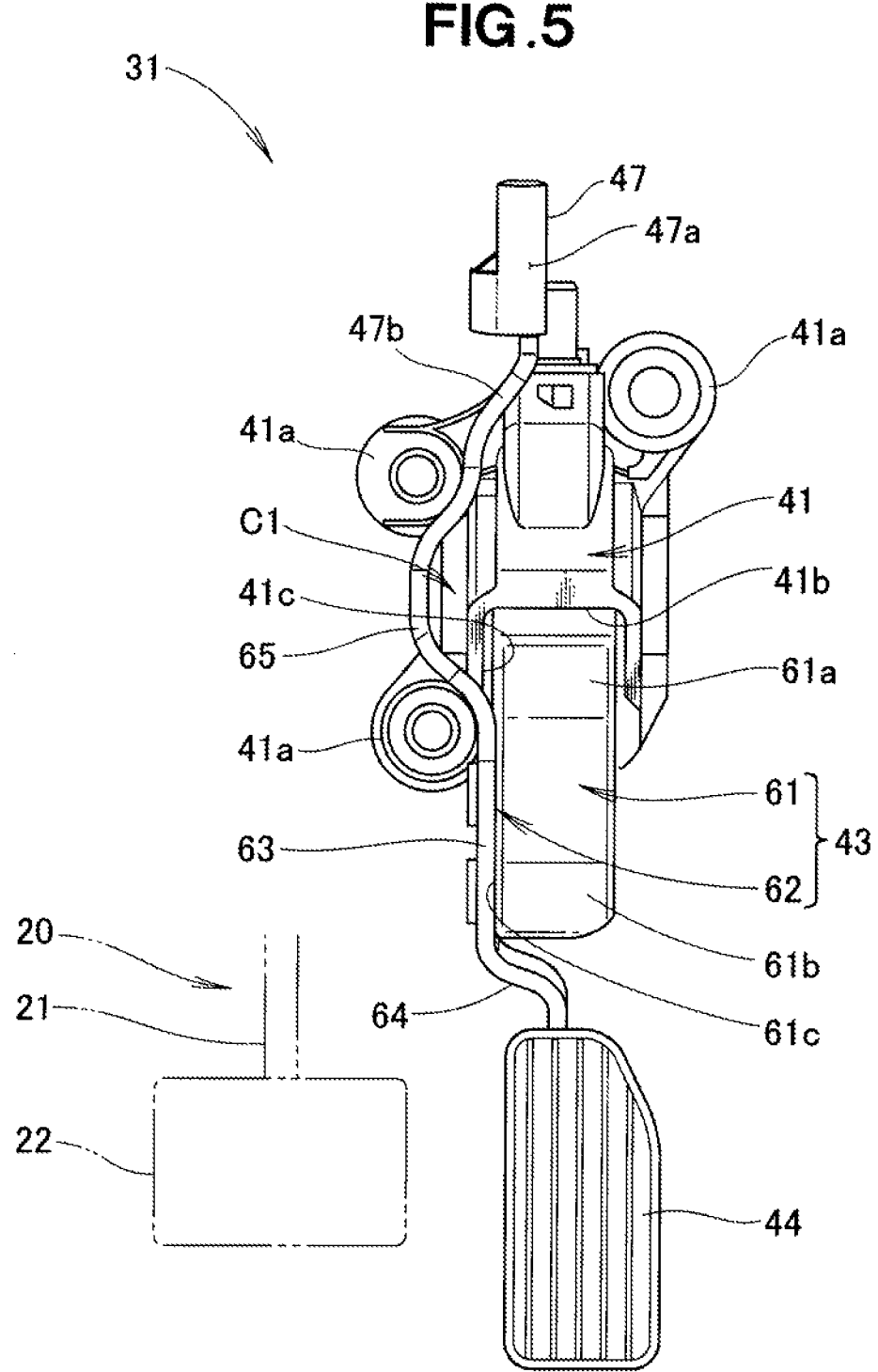
FIG. 5 is an enlarged view of the accelerator pedal unit shown in FIG. 2.
Figure 6:
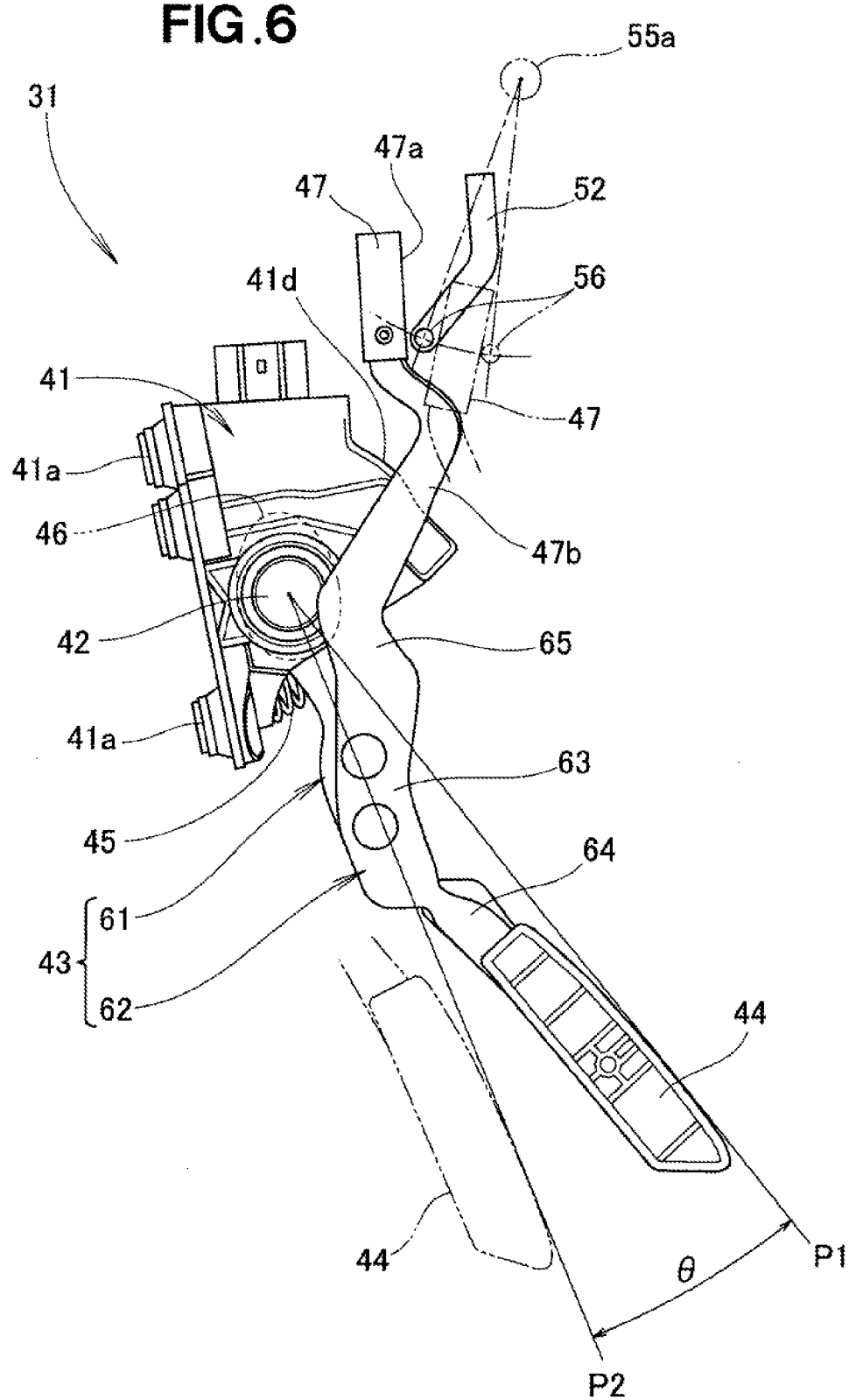
FIG. 6 is a left side view of the accelerator pedal unit shown in FIG. 5.

First, the basic configuration of the accelerator pedal unit 31 will be described. As shown in FIGS. 4 through 6, the accelerator pedal unit 31 includes a housing 41 mountable on the vehicle body 12 (FIG. 1), a pedal-side arm 43 pivotably supported by a support shaft 42 in the housing 41 for undergoing pivotal movement in a longitudinal or front-rear direction of the vehicle body, a depressible pad 44 provided on the pedal-side arm 43, a return spring 45 (FIG. 6) for biasing the pedal-side arm 43 in a direction to release the pedal-depressing operation, and a pivot sensor 46 (FIG. 6) for detecting an amount by which the pedal-side arm 43 pivots.

The pivot sensor 46 is provided inside the housing 41. The pad 44 is disposed so as to be able to be laterally adjacent to the brake pedal 21 of the vehicle braking device 20 (FIG. 5).

In the accelerator pedal unit 31, the pedal-side arm 43 pivots forward of the vehicle body 12 as a result of the pad 44 being depressed by a driver; therefore, the amount of pivotal movement of the pedal-side arm 43 is detected by the pivot sensor 46 (FIG. 6), and an electrical detection signal is generated from the pivot sensor 46. A control device (not shown) receiving the detection signal from the pivot sensor 46 controls a travel drive source, and thereby allows the state of acceleration of the vehicle 10 (FIG. 1) to be controlled.

As shown in FIG. 1, the accelerator pedal unit 31, is disposed laterally proximal to (directly next to) the wheel house 14, and is mounted on the vehicle body 12. The accelerator pedal unit 31 is described in detail later.

Next, the reaction-force-applying mechanism 32 will be described. As shown in FIG. 1, the reaction-force-applying mechanism 32 is disposed above the housing 41 of the accelerator pedal unit 31. More specifically, the reaction-force-applying mechanism 32 is disposed at a position above and somewhat laterally outside of the housing 41, is set apart from the housing 41, and is mounted on the vehicle body 12 so as to be separate from the housing 41. Specifically, the reaction-force-applying mechanism 32 is positioned somewhat laterally outside of the housing 41, but is disposed above the wheel house 14, and accordingly does not interfere with the wheel house 14.

Figure 7:
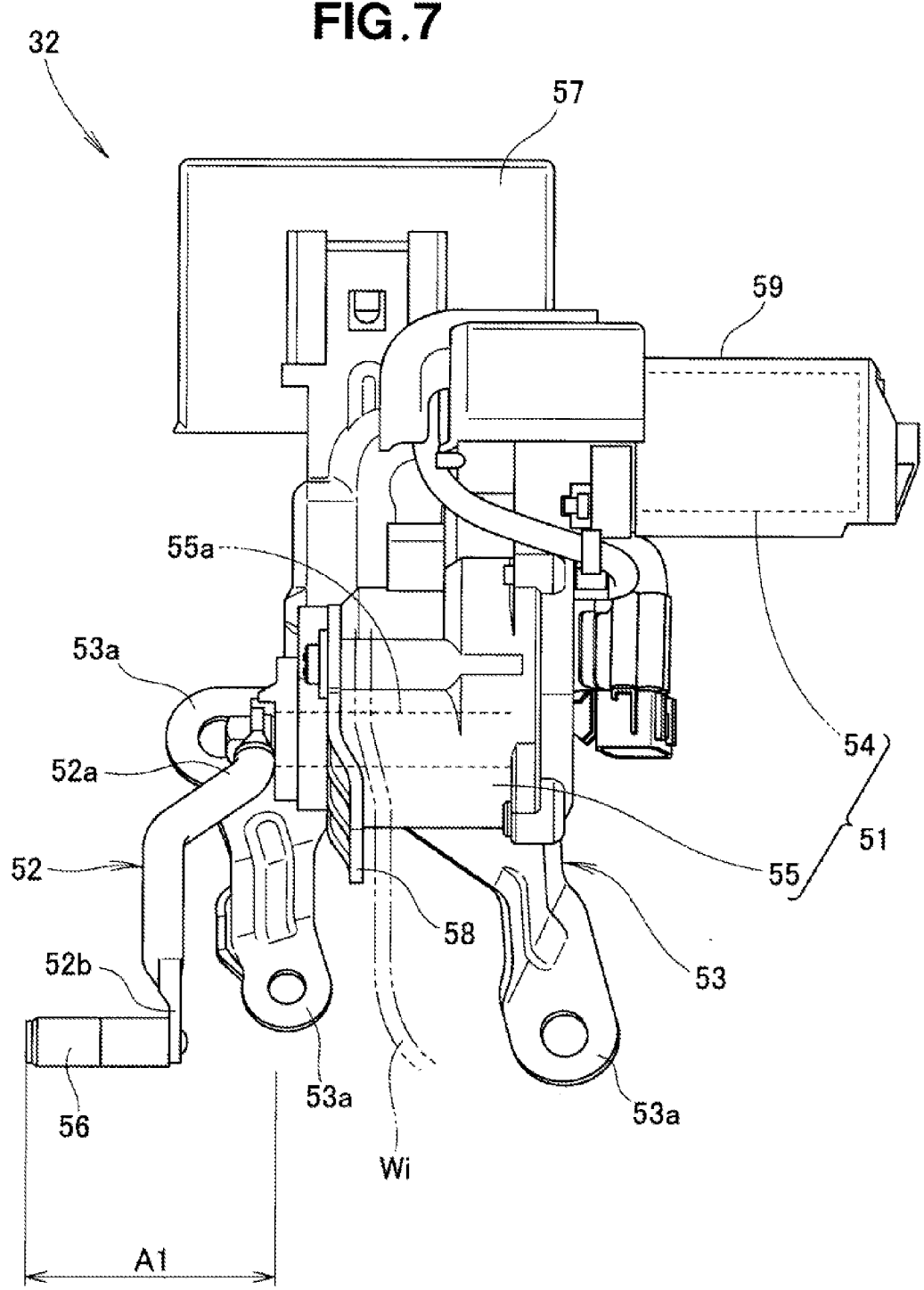
FIG. 7 is an enlarged view of a reaction-force-applying mechanism shown in FIG. 2.
Figure 8:
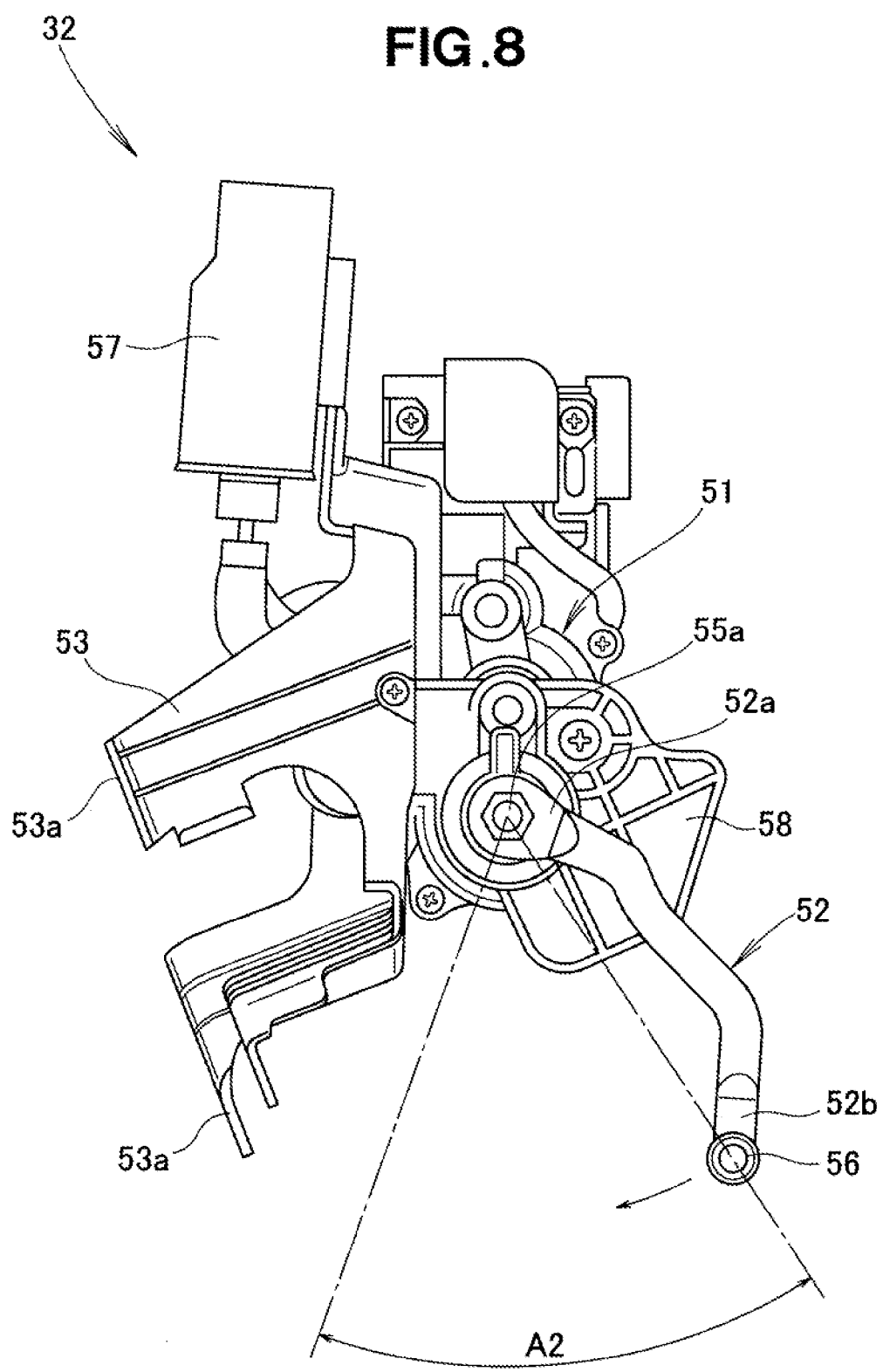
FIG. 8 is a left side view of the reaction-force-applying mechanism shown in FIG. 7.

The reaction-force-applying mechanism 32 applies, in accordance with a control signal from a control unit (not shown), a reaction force to the pedal-side arm 43 against the depressing force applied to the pad 44. Specifically, as shown in FIGS. 7 and 8, the reaction-force-applying mechanism 32 includes a drive source 51 for generating the reaction force, a transmitting member 52 for transmitting the reaction force generated by the drive source 51 to the pedal-side arm 43 (FIG. 2), and a bracket 53 for supporting the drive source 51.

The drive source 51 includes an electric motor 54 for generating the reaction force and a reduction gear 55 for reducing a rotational speed of the electric motor 54 and outputting the reduced speed. The electric motor 54 is configured by, e.g. a servo motor, and is disposed so that a rotating shaft (not shown) faces in the lateral or vehicle width direction. The reduction gear 55, similarly to the electric motor 54, is disposed so that an output shaft 55a faces in the lateral direction. The electric motor 54 is incorporated into an upper part of the reduction gear 55. The output shaft 55a of the reduction gear 55 has an output end positioned on the laterally inward side.

The transmitting member 52 is connected to the output shaft 55a of the reduction gear 55, and is configured by a motor-side arm for transmitting the reaction force to the pedal-side arm 43 (FIG. 3). The term "transmitting member 52" may be rephrased as "motor-side arm 52" hereinbelow, where appropriate.

Specifically, a proximal end part 52a of the motor-side arm 52 is mounted so as to prevent relative rotation with respect to the output shaft 55a of the reduction gear 55. Furthermore, the motor-side arm 52 extends rearward and downward from the proximal end part 52, and has a contact arm part 56 on a distal end part 52b. The contact arm part 56 is parallel with the output shaft 55a of the reduction gear 55, and extends from the distal end part 52b of the motor-side arm 52 to the laterally inward side.

As shown in FIGS. 1, 7, and 8, the bracket 53 is a member mountable on the vehicle body 12 (e.g., the lower dashboard panel 13). Specifically, the bracket 53 has a plurality of flanges 53a, and bolting the plurality of flanges 53a to the vehicle body 12 detachably mounts the bracket 53 to the vehicle body 12. At a minimum, the bracket 53 supports the electric motor 54, the reduction gear 55, and a motor drive control unit 57. As a result, the reaction-force-applying mechanism is mountable on the vehicle body 12.

Harnesses, cables, or other wires Wi used for other devices often pass around the reaction-force-applying mechanism 32 mounted on the vehicle 10. In response, the bracket 53 has a cable guard 58 extending outward and upward of a range A1, A2 in which the motor-side arm 52 can pivot and move. The pivoting motor-side arm 52 can be protected by the cable guard 58 so as not to come into contact with the harnesses, cables, or wires Wi.

As shown in FIGS. 7 and 8, an outer circumference and an upper side of the electric motor 54 are covered by a heat-blocking cover 59 for blocking at least part of heat generated by the electric motor 54. Therefore, it is possible for the heat-blocking cover 59 to provide protection so that the heat generated by the electric motor 54 does not affect the harnesses, cables, or other wires Wi.

Next, the accelerator pedal unit 31 will be described in detail. As shown in FIGS. 1, 4, and 6, the housing 41 is a member mountable on the vehicle body 12 (e.g., the lower dashboard panel 13). Specifically, the housing 41 has a plurality of flanges 41a, and bolting the plurality of flanges 41a to the vehicle body 12 detachably mounts the housing 41 to the vehicle body 12. As a result, the accelerator pedal unit 31 is mountable on the vehicle body 12.

A substantially rectangular opening 41b is formed rearward and downward of the housing 41. The proximal end part of the pedal-side arm 43 is inserted into the housing 41 through the opening 41b, and is supported by the laterally extending support shaft 42.

The pedal-side arm 43 has an extension part 47 extending to a side opposite the pad 44, across the support shaft 42, and from the pedal-side arm 43 toward the transmitting member 52 (motor-side arm 52) of the reaction-force-applying mechanism 32. The extension part 47 comes into contact with the transmitting member 52 (in particular, the contact arm part 56) at least when the reaction force is received from the transmitting member 52. Only the extension part 47 of the pedal-side arm 43 can come into contact with the transmitting member 52. Specifically, a rear surface 47a in the longitudinal or front-rear direction of the vehicle body 12 on the distal end portion of the extension part 47 is capable of coming into contact with the transmitting member 52.

More specifically, as shown in FIGS. 4 through 6, the pedal-side arm 43 includes a first arm part 61 pivotably supported in the housing 41 by the support shaft 42 for undergoing pivotal movement in the longitudinal or front-rear direction of the vehicle body and a second arm part 62 positioned outside of the housing 41 and provided on the first arm part 61. The pad 44 and the extension part 47 are provided on the second arm part 62. The extension part 47 is positioned above the second arm part 62. Thus, because the pedal-side arm 43 is constituted by the first arm part 61 and the second arm part 62, it is possible to determine whether or not the second arm part 62 should be present according to, e.g., whether the reaction-force-applying mechanism 32 is present.

Figure 9:
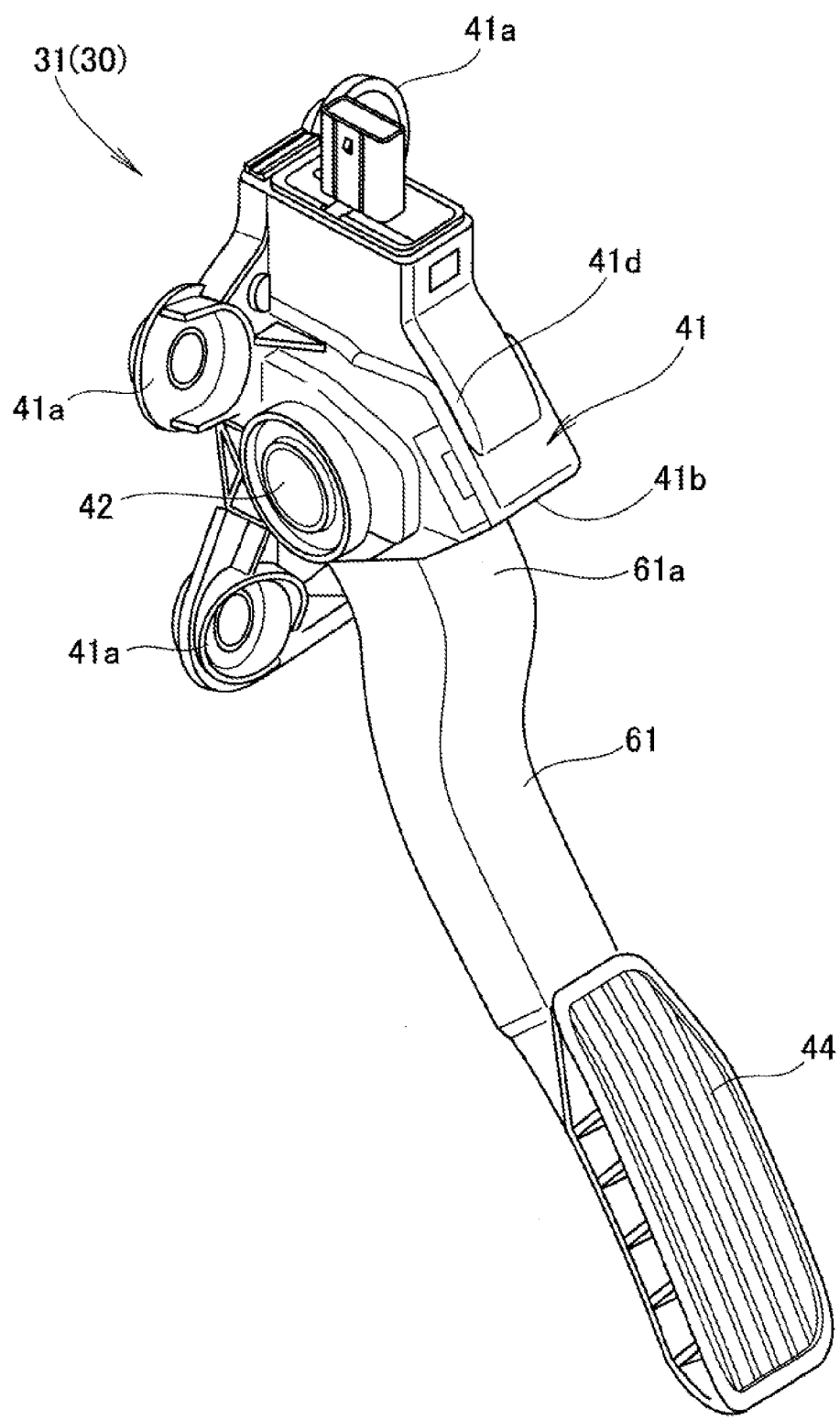
FIG. 9 is a perspective view of an example of a replacement for the pedal-side arm of the accelerator pedal unit shown in FIG. 4.

As shown in FIG. 9, in a "first case" in which the accelerator device 30 is not provided with the reaction-force-applying mechanism 32 (FIG. 2), it is possible to use only the first arm part 61 without using the second arm part 62. In this case, the pad 44 is provided on the first arm part 61.

However, as shown in FIG. 2, in a "second case" in which the accelerator device 30 is provided with the reaction-force-applying mechanism 32, the second arm part 62 provided with the pad 44 and the extension part 47 is made available and is provided on the first arm part 61.

In both the first case and the second case, the housing and an inner mechanism built into the housing (e.g., the pivot sensor 46 shown in FIG. 6) can be jointly used. The accelerator device 30 can therefore be obtained at low cost.

As shown in FIGS. 4 through 6, an arm proximal end part 61a of the first arm part 61 is integrally provided on the first arm part, accommodated inside the housing 41, and pivotably supported by the support shaft 42 for undergoing pivotal movement in the longitudinal or front-rear direction of the vehicle body. A distal end 61b of the first arm part 61 is exposed to the outside through the opening 41b in the housing 41.

The second arm part 62 is a vertically long and narrow member, and has a mounting part 63 mounted to a lateral side surface 61c of the first arm part 61, a bent part 64 provided below the mounting part 63, and a curved part 65 provided above the mounting part 63. The mounting part 63 is disposed below the opening 41*b*.

Thus, the pedal-side arm 43 is configured so that the second arm part 62 is mounted to the lateral side surface 61*c* of the first arm part 61. Therefore, the second arm part 62 can be easily mounted on the first arm part 61 without contact being made with the housing 41.

The bent part 64 bends from the mounting part 63 to the side laterally opposite the brake pedal 21 (to the laterally outward side). The pad 44 is provided to the bent part 64; i.e., to a lower end part of the second arm part 62. Therefore, the accelerator device 30 can be easily disposed while interference with the brake pedal 21 positioned in the lateral vicinity of the accelerator device 30 is sufficiently avoided.

The curved part 65 curves in a substantially sideways V-shape or sideways U-shape as seen from the rear, curving so as to separate laterally from a side edge 41*c* of the opening 41*b*. The curved part 65 is disposed across the side edge 41*c* of the opening 41*b*. Therefore, the gap C1 between the housing 41 and the second arm part 62 (FIG. 5) can be increased in size at a position where the second arm part 62 is disposed across the side edge 41*c* of the opening 41*b*. Sandwiching of a foreign object in the gap C1 in the vicinity of the opening 41*b* can therefore be minimized.

Here, a position P1 of the pedal-side arm 43 when the pad 44 is not depressed will be called the "initial position P1." Another position P2 of the pedal-side arm 43 when the pad 44 is depressed by a maximum amount will be called the "maximum-depression position P2." The angle by which the pedal-side arm 43 pivots from the initial position P1 to the maximum-depression position P2 is θ.

As shown in FIGS. 4 through 6, the second arm part 62 is disposed on a laterally inward side of the housing 41. The extension part 47 has a slanting part 47*b* above the curved part 65. The slanting part 47*b* slants toward the housing 41 while extending above an upper edge 41*d* of the laterally inward side of the housing 41. The upper edge 41*d* of the housing 41 slants, e.g., rearwards and downwards. A gap C2 is present between the upper edge 41*d* and the slanting part 47*b*. Specifically, when the pedal-side arm 43 pivots between the initial position P1 and the maximum-depression position P2, a gap C2 is present at the position closest to the housing 41 and the extension part 47. The gap C2 will be described in detail below with reference to FIGS. 5, 6, and 10.

Figure 10A:
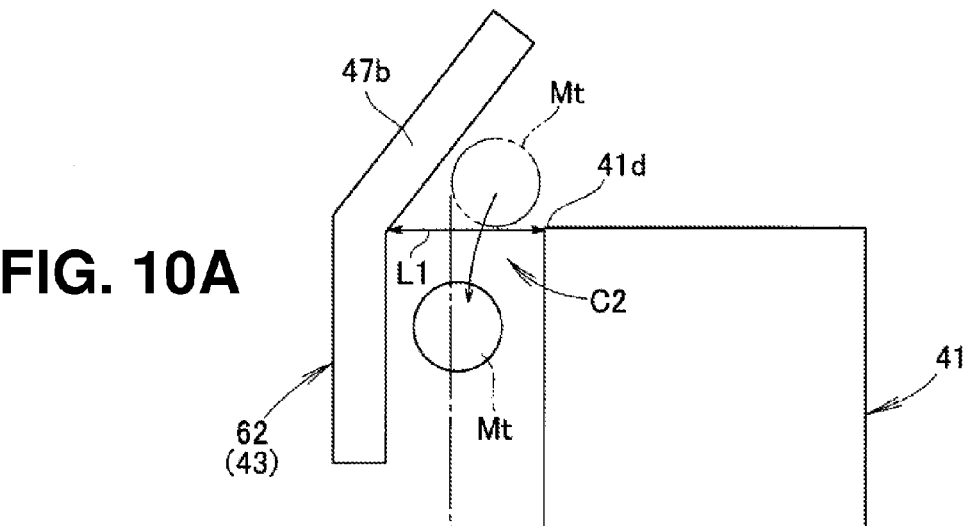
FIGS. 10A and 10B are diagrammatical views illustrating a change in the gap between an upper edge of a housing and an extension part shown in FIG. 5.
Figure 10B:
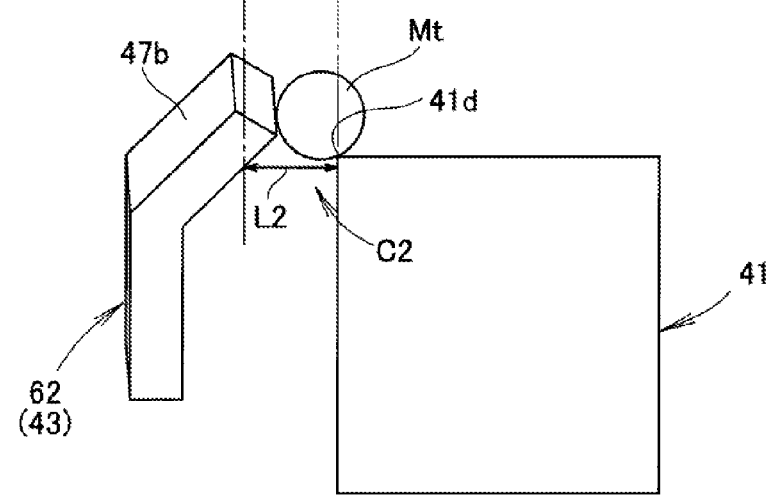

FIGS. 10A and 10B schematically show the relationship between the upper edge 41*d* of the housing 41 and the slanting part 47 of the second arm part 62, with reference to FIG. 5.

When, as shown in FIG. 6, the second arm part 62 of the pedal-side arm 43 is positioned at the initial position P1, as shown in FIG. 10A the size of the gap C2 (the size at the initial time) equals L1, which is relatively large.

However, when, as shown in FIG. 6, the second arm part 62 of the pedal-side arm 43 is positioned at the maximum-depression position P2, as shown in FIG. 10B the size of the gap C2 (the size when the pedal is depressed) equals L2, which is smaller than the size at the initial time.

Thus, the second arm part 62 is disposed in relation to the housing 41 so that the gap C2 decreases in correspondence with the pivoting of the pedal-side arm 43 from the initial position P1 toward the maximum-depression position P2. Therefore, the gap C2 at the position where the extension part 47 is closest to the housing 41 decreases in correspondence with the pivoting of the pedal-side arm 43 from the initial position P1 toward the maximum-depression position P2. Specifically, the gap C2 when the pedal-side arm 43 is in the initial position P1 is larger than the gap C2 when the pad 44 is depressed.

Even if some foreign object Mt gets sandwiched between the housing 41 and the extension part 47, specifically in the gap C2, while the pad 44 is being depressed, the gap C2 can be increased by releasing the pedal-depressing operation (returning the pedal-side arm 43 to the initial position P1). As a result, the foreign object Mt falls out of the gap C2. Thus, releasing the pedal-depressing operation allows the pedal-side arm 43 to be returned to the initial position P1 without any adverse effect caused by the foreign object Mt.

Furthermore, the position of the pedal-side arm 43 closest to the housing 41 and the extension part 47 when positioned at the initial position P1 is on an upper edge 41*d* of the housing 41. Specifically, the extension part 47 is closest to the upper edge 41*d* of the housing 41 when the pedal-side arm 43 is positioned at the initial position P1.

Therefore, the slanting part 47*b* approaches the housing 41 in correspondence with the pivoting of the pedal-side arm 43 from the initial position P1 toward the maximum-depression position P2. The gap C2 at the position where the extension part 47 is closest to the upper edge 41*d* of the housing 41 is therefore decreased in size.

The slanting part 47*b* then separates from the housing 41 in correspondence with the returning of the pedal-side arm 43 from the maximum-depression position P2 to the initial position P2. The gap C2 at the position where the extension part 47 is closest to the upper edge 41*d* of the housing 41 is increased in size. Therefore, sandwiching of a foreign object in a direction in which the pedal-side arm 43 returns from the maximum-depression position P2 to the initial position P1 can be minimized.

The description of the foregoing embodiment can be summarized as follows. As shown in FIGS. 1 and 3, the reaction-force-applying mechanism 32 for applying a reaction force to the pedal-side arm 43 is disposed above the housing 41 in which the pedal-side arm 43 is supported by the support shaft 42.

Specifically, because the accelerator pedal unit 31 including the housing 41 and the pedal-side arm 43 supported in the housing 41 does not include the reaction-force-applying mechanism 32, the unit 31 has a small size in the lateral or vehicle width direction. The accelerator pedal unit 31, being of small width, can be easily disposed in a non-interfering manner even when the unit 31 is laterally proximal to the wheel house 14 or the brake pedal 21.

However, the reaction-force-applying mechanism 32 includes the drive source 51 for generating reaction force and the transmitting member 52 for transmitting the reaction force generated by the drive source 51 to the pedal-side arm 43, and therefore has a larger lateral size than the accelerator pedal unit 31.

The reaction-force-applying mechanism 32, being of large width, is disposed above the housing 41 of the accelerator pedal unit 31, which is of small width. Specifically, the reaction-force-applying mechanism 32 is disposed above the wheel house 14 or the pad 22 of the brake pedal 21. Therefore, interference between the reaction-force-applying mechanism 32 and the wheel house 14 or the pad 22 of the brake pedal 21 can be prevented.

The lateral size of the portion of the accelerator device 30 closest to the wheel house 14 or the brake pedal 21 in the lateral direction, specifically the lateral size of the accelerator pedal unit 31, can thus be reduced as much as possible. The accelerator device 30, being of small width, can be easily disposed without any interference with the wheel house 14, the brake pedal 21, or other members positioned in the lateral vicinity of the accelerator device 30. The degree of freedom in arranging the accelerator device 30 in the vehicle 10 is enhanced.

The pedal-side arm 43 has the extension part 47 extending to a side opposite the pad 44, across the support shaft 42, and from the pedal-side arm 43 toward the transmitting member 52 of the reaction-force-applying mechanism 32. The extension part 47 comes into contact with the transmitting member 52 when the reaction force is received from the transmitting member 52. Therefore, the configuration of the reaction-force-applying mechanism 32 can be kept simple despite having the reaction-force-applying mechanism 32 disposed above the housing 41. The accelerator device 30 can therefore be obtained at low cost.

Furthermore, the transmitting member 52 of the reaction-force-applying mechanism 32 comes into contact with only the extension part 47, whereby the reaction-force-applying mechanism 32 can apply the reaction force to the pedal-side arm 43. Moreover, the reaction-force-applying mechanism 32 is set apart from the housing 41, and is mounted on the vehicle body 12 so as to be separate from the housing 41. Therefore, each of the housing 41 and the reaction-force-applying mechanism 32 can be mounted on the vehicle body 12 in respectively desired locations. Therefore, an even larger degree of freedom can be used in regard to where to dispose the accelerator device 30 in the vehicle 10.

In the present invention, the second arm part 62 may have any configuration as long as the second arm part 62 is provided on the first arm part 61, including a configuration integral with the first arm part in addition to a configuration in which the second arm part is a member that is separate from the first arm part.

INDUSTRIAL APPLICABILITY

The vehicle accelerator device 30 according to the present invention is suitable for use in compact passenger vehicles.

The invention claimed is:

1. A vehicle accelerator device comprising: a housing mountable on a vehicle body; a pedal-side arm pivotably supported by a support shaft in the housing for undergoing pivotal movement in a front-rear direction of the vehicle body; a depressible pad provided on the pedal-side arm; and a reaction-force-applying mechanism for applying a reaction force to the pedal-side arm against a depressing force applied to the pad, the reaction-force- applying mechanism comprising a drive source for generating the reaction force and a transmitting member for transmitting the reaction force generated by the drive source to the pedal-side arm, wherein:
the reaction-force-applying mechanism is set apart from the housing, and is mounted on the vehicle body separately from the housing;
the pedal-side arm has an extension part extending toward the transmitting member; and
the extension part comes into contact with the transmitting member when the reaction force is received from the transmitting member.

2. The vehicle accelerator device of claim 1, wherein the reaction-force-applying mechanism is disposed outside of and above the housing.

3. The vehicle accelerator device of claim 2, wherein:
the pedal-side arm comprises a first arm part pivotably supported in the housing by the support shaft for undergoing pivotal movement in the front-rear direction of the vehicle body and a second arm part positioned outside of the housing and provided on the first arm part; and
the pad and the extension part are provided on the second arm part.

4. The vehicle accelerator device of claim 3, wherein:
the pad is configured to be disposed adjacent in a vehicle width direction to a brake pedal provided on the vehicle body;
the second arm part comprises a mounting part mounted to a lateral side surface of the first arm part and a bent part bending from the mounting part to a side laterally opposite the brake pedal; and
the pad is provided on the bent part.

5. The vehicle accelerator device of claim 3, wherein:
the pedal-side arm pivots between an initial position at which the pad is not depressed and a maximum-depression position at which the pad is depressed by a maximum amount;
the pedal-side arm, the housing, and the extension part are configured such that a gap is present at a position where the housing and the extension part are closest when the pedal-side arm pivots between the initial position and the maximum-depression position; and
the second arm part is disposed in relation to the housing such that the gap decreases in correspondence with the pivoting of the pedal-side arm from the initial position toward the maximum-depression position.

6. The vehicle accelerator device of claim 5, wherein:
the position of the pedal-side arm closest to the housing and the extension part when positioned at the initial position is on an upper edge of the housing; and
the extension part has a slanting part slanting toward the housing while extending above the upper edge of the housing.

7. The vehicle accelerator device of claim 3, wherein:
an arm proximal end part provided on the first arm part and supported by the support shaft is accommodated inside the housing;
a distal end part of the first arm part is exposed to the outside through an opening in the housing;
the second arm part comprises a mounting part mounted to a lateral side surface of the first arm part and a curved part curving so as to separate laterally from a side edge of the opening;
the mounting part is disposed below the opening; and
the curved part is disposed across the side edge of the opening.

8. The vehicle accelerator device of claim 1, wherein:
the drive source comprises an electric motor for generating the reaction force and a reduction gear for reducing a rotational speed of the electric motor and outputting the reduced speed;
the transmitting member is connected to an output shaft of the reduction gear and is configured by a motor-side arm for transmitting the reaction force to the pedal-side arm;
the reaction-force-applying mechanism has a bracket for supporting the electric motor and the reduction gear; and
the bracket has a cable guard extending outward and upward of a range in which the motor- side arm can pivot and move.

9. The vehicle accelerator device of claim 8, wherein an outer circumference and an upper side of the electric motor are covered by a heat-blocking cover for blocking at least part of heat generated by the electric motor.

* * * * *